US006903635B2

(12) United States Patent
Brignoni et al.

(10) Patent No.: US 6,903,635 B2
(45) Date of Patent: Jun. 7, 2005

(54) CIRCUIT BREAKER INTERFACE MECHANISM FOR AUXILIARY SWITCH ACCESSORY

(75) Inventors: Luis Brignoni, Toa Baja, PR (US); Ronald Ciarcia, Bristol, CT (US); Ananthram Subramanian, Secunderabad (IN); Narender Macha, Hyderbad (IN)

(73) Assignee: General Electric Company, Schenectady, NY (US)

( * ) Notice: Subject to any disclaimer, the term of this patent is extended or adjusted under 35 U.S.C. 154(b) by 160 days.

(21) Appl. No.: 10/249,861

(22) Filed: May 13, 2003

(65) Prior Publication Data

US 2004/0227601 A1 Nov. 18, 2004

(51) Int. Cl.[7] .................................................. H02B 1/08

(52) U.S. Cl. ............................... 335/6; 335/13; 335/17; 200/17 R

(58) Field of Search ................................ 335/6, 11, 13, 335/17, 167–171; 200/17 R, 18, 330–332.1

(56) References Cited

U.S. PATENT DOCUMENTS

| | | | | |
|---|---|---|---|---|
| 4,794,356 A | * 12/1988 | Yu et al. | ........................ | 335/13 |
| 6,114,641 A | 9/2000 | Castonguay et al. | ......... | 200/244 |
| 6,175,288 B1 | 1/2001 | Castonguay et al. | .......... | 335/16 |
| 6,218,919 B1 | 4/2001 | Ciarcia et al. | .............. | 335/167 |
| 6,396,369 B1 | 5/2002 | Schlitz et al. | ................. | 335/16 |

* cited by examiner

*Primary Examiner*—Ramon M. Barrera
(74) *Attorney, Agent, or Firm*—Cantor Colburn LLP

(57) ABSTRACT

An assembly for interacting with a circuit breaker operating mechanism of a circuit breaker including a housing and a pair of contacts within the housing, the operating mechanism arranged to separate the pair of contacts upon the occurrence of a trip event is disclosed. The assembly includes a plurality of linkages arranged to transmit mechanical energy from the operating mechanism to a plunger of an accessory device for changing a state thereof. The system of linkages is configured to compensate for any over-travel resulting from possible tolerance variations.

19 Claims, 6 Drawing Sheets

CIRCUIT BREAKER INTERFACE MECHANISM FOR AUXILIARY SWITCH ACCESSORY

BACKGROUND OF THE INVENTION

This invention relates to circuit breakers, and, more particularly to a circuit breaker interface mechanism for an auxiliary switch accessory.

It is generally well known in the art of circuit breakers to provide a reset mechanism to reset a tripping device such as an accessory shunt trip or under voltage device. During quiescent operation, (i.e. when the circuit breaker contacts are closed to allow the flow of electrical current) the operating handle of an operating mechanism is in the "ON" position. To stop the current flow manually, the handle may be shifted to the "OFF" position thereby opening the electrical contacts. Upon attainment of a pre-determined condition (trip event), such as ground fault or overload, the operating mechanism of the circuit breaker will release the forces of the mechanism operating springs and release the operating handle to a tripped position between the "ON" position and the "OFF" position. Before the circuit breaker may be turned "ON", the operating mechanism must be manually reset. This is accomplished by rotating the operating handle beyond the "OFF" position against the bias of the operating mechanism springs, thereby locking the operating mechanism in position.

The same mechanical forces used to direct the operating mechanism from the tripped position to the reset position are used to reset any attached accessories, such as a shunt trip actuator, auxiliary switch accessory, bell alarm or other type of accessory unit. However, as accessories are generally separate components mounted proximate to the operating mechanism, positional variations at the interface of the accessory and the circuit breaker operating mechanism are possible due to manufacturing tolerances. These positional variations can affect the resetting motion translated to the bell alarm switch or its components by not compensating for any over-travel resulting from the possible tolerance variations. Furthermore, a reliable interface mechanism between the circuit breaker and internal accessories is desired that will provide reliable actuation of the accessory switch to change a state thereof when the breaker changes state in either an "on", "off", or "trip" operation without robbing energy from the operating mechanism during the "off" to "on" operation, which is common with conventional accessory interface systems. Conventional accessory interface systems between the operating mechanism and accessories presently rely only on limited "take up" provided by the accessory switch. It is further desired that the switch also be field installable by the customer without violating UL requirements.

BRIEF DESCRIPTION OF THE INVENTION

The above discussed and other drawbacks and deficiencies of the prior art are overcome or alleviated by an assembly for interacting with a circuit breaker operating mechanism of a circuit breaker including a housing and a pair of contacts within the housing, the operating mechanism arranged to separate the pair of contacts upon the occurrence of a trip event. The assembly includes a plurality of linkages arranged to transmit mechanical energy from the operating mechanism to a plunger of an accessory device for changing a state thereof. The system of linkages is configured to compensate for any over-travel resulting from possible tolerance variations.

In an exemplary embodiment of the invention, an assembly for interacting with a circuit breaker operating mechanism of a circuit breaker, the assembly includes an accessory device disposed in the housing including a plunger configured for movement between a retracted position and a protruded position. A crank link having operable communication with the operating mechanism is in further mechanical cooperation with a first link that in turn is in mechanical cooperation with a second link. The second link is in further mechanical cooperation with the plunger. When the operating mechanism applies a force to the crank link, the force changes a state of the accessory device by being transmitted from the operating mechanism to the crank link, from the crank link to the first link, from the first link to the second link, and from the second link to the plunger for changing a position of the plunger from either the protruded position or the retracted position.

BRIEF DESCRIPTION OF THE DRAWINGS

Referring now to the drawings wherein like elements are numbered alike in the several FIGURES.

DETAILED DESCRIPTION OF THE INVENTION

Figure 1:
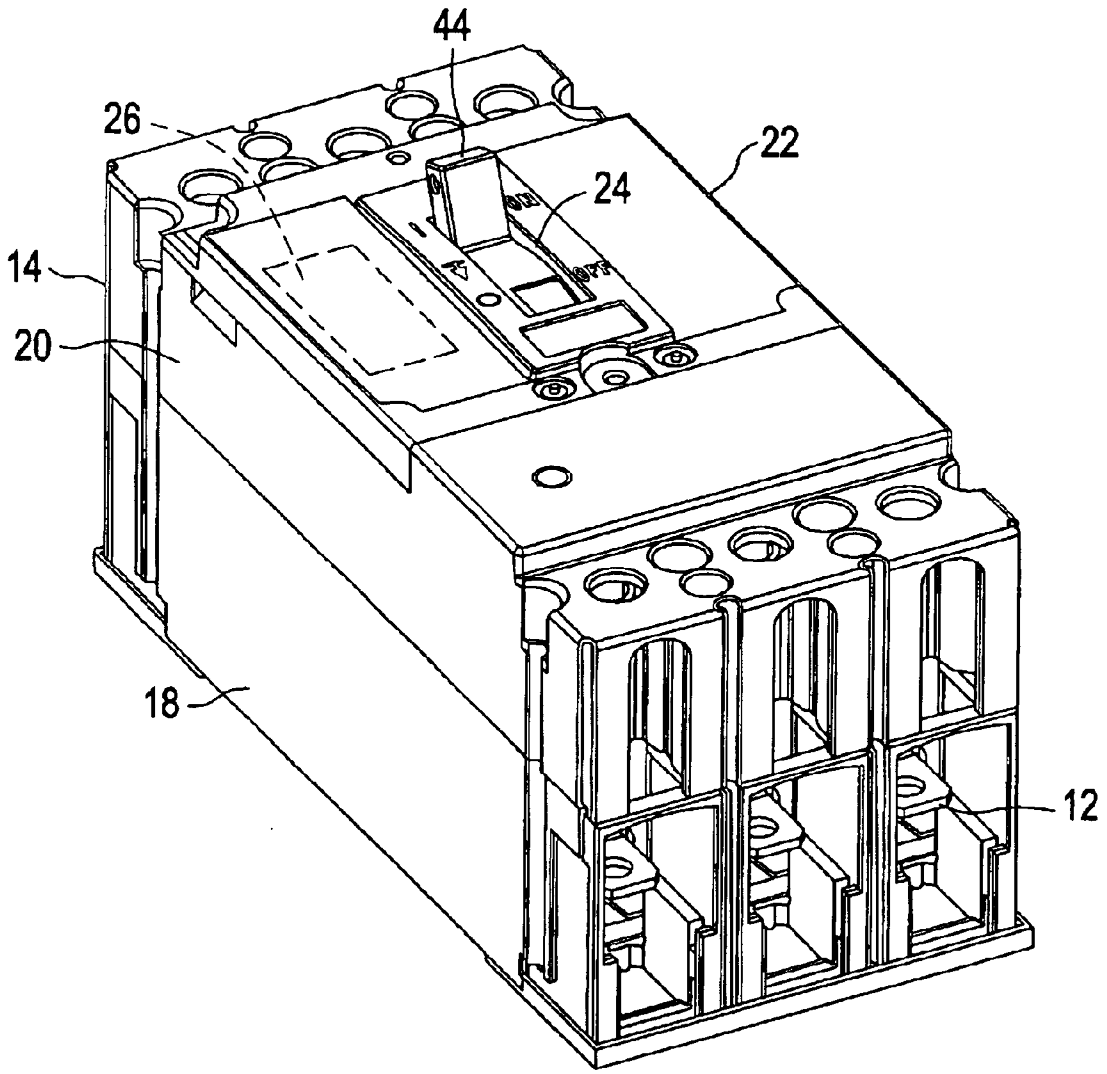
FIG. 1 is a top perspective view of a molded case circuit breaker.

Referring to FIG. 1, a top perspective view of a molded case circuit breaker 10 is generally shown. Molded case circuit breaker 10 is generally interconnected within a protected circuit between multiple phases of a power source (not shown) at line end 14 and a load to be protected (not shown) at load end 12. Molded case circuit breaker 10 includes a base 18, a mid cover 20 and a top cover 22 having a toggle handle (operating handle) extending through an opening 24. Toggle handle 44 is interconnected with a circuit breaker operating mechanism 38 (FIG. 2) and allows for external operation of cassettes 32, 34 and 36. An accessory (e.g., a bell alarm switch) 26 is positioned within the mid cover 20 as shown in phantom, and interfaces with circuit breaker operating mechanism 38. In an exemplary embodiment, the accessory 26 is a bell alarm switch (switch), however, other auxiliary switch accessories are contemplated.

Figure 2:
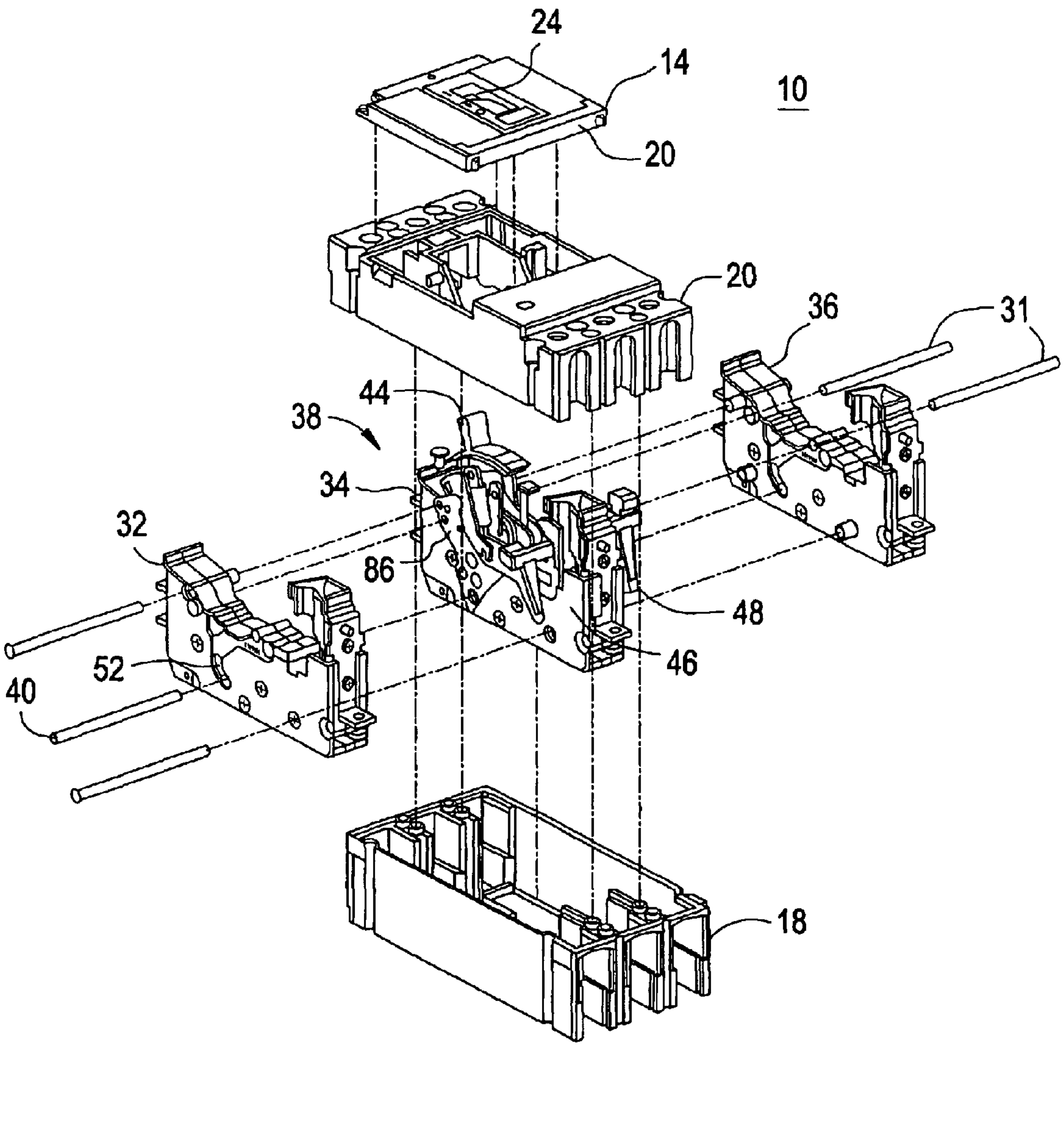
FIG. 2 is an exploded perspective view of a molded case circuit breaker.

Referring now to FIG. 2, an exploded view of molded case circuit breaker 10 is provided. A series of circuit breaker cassettes 32, 34, 36 are generally well known and may be, for example, of the rotary type. Examples of rotary contact structures that may be operated by operating mechanism 38 are described in more detail in U.S. Pat. Nos. 6,114,641 and 6,396,369, both entitled “Rotary Contact Assembly For High-Ampere Rated Circuit Breakers”, and U.S. Pat. No. 6,175,288, entitled “Supplemental Trip Unit For Rotary Circuit Interrupters”.

Circuit breaker cassettes 32, 34, 36 are seated approximately upstanding within base 18, and the cassette 34 includes operating mechanism 38 positioned thereon. The individual phases of current are divided into three phases, wherein each phase passes through one of the circuit breaker cassettes 32, 34, 36. Each of cassettes 32, 34, 36 includes one or more contact pairs therein for passage of current when the contacts are closed and for preventing passage of current when the contact pairs are opened. It is contemplated that the number of phases, or specific type of cassette utilized, can vary according to factors including, but not limited to, the type of load circuit being protected and the type of line input being provided to the circuit breaker 10.

Still referring to FIG. 2, each cassette 32, 34, 36 is commonly operated by a cross bar (cross pin) 40 that interfaces with the internal mechanisms of cassettes 32, 34, 36 such that when one of cassettes 32, 34, 36 are opened or closed, the other cassettes 32, 34, 36 will operate cooperatively. It will be recognized by one skilled in the pertinent art that only one cross bar may be used to interface with the internal mechanisms of cassettes 32, 34, 36 such that when one of cassettes 32, 34, 36 are opened or closed, the other cassettes 32, 34, 36 will operate cooperatively. Positioning rods 31 are also employed to position the cassettes 32, 34, 36 adjacent to each other. Operating mechanism 38 is positioned and configured atop cassette 34, which is generally disposed intermediate to cassettes 32 and 36. Operating mechanism 38 operates substantially as described herein and as described in U.S. patent application Ser. No. 6,218,919, entitled “Circuit Breaker Latch Mechanism with Decreased Trip Time”. However, it is contemplated that other operating mechanisms may be employed, as well. The cassettes 32, 34, 36 are typically formed of high strength plastic material and each include opposing sidewalls.

Figure 3:
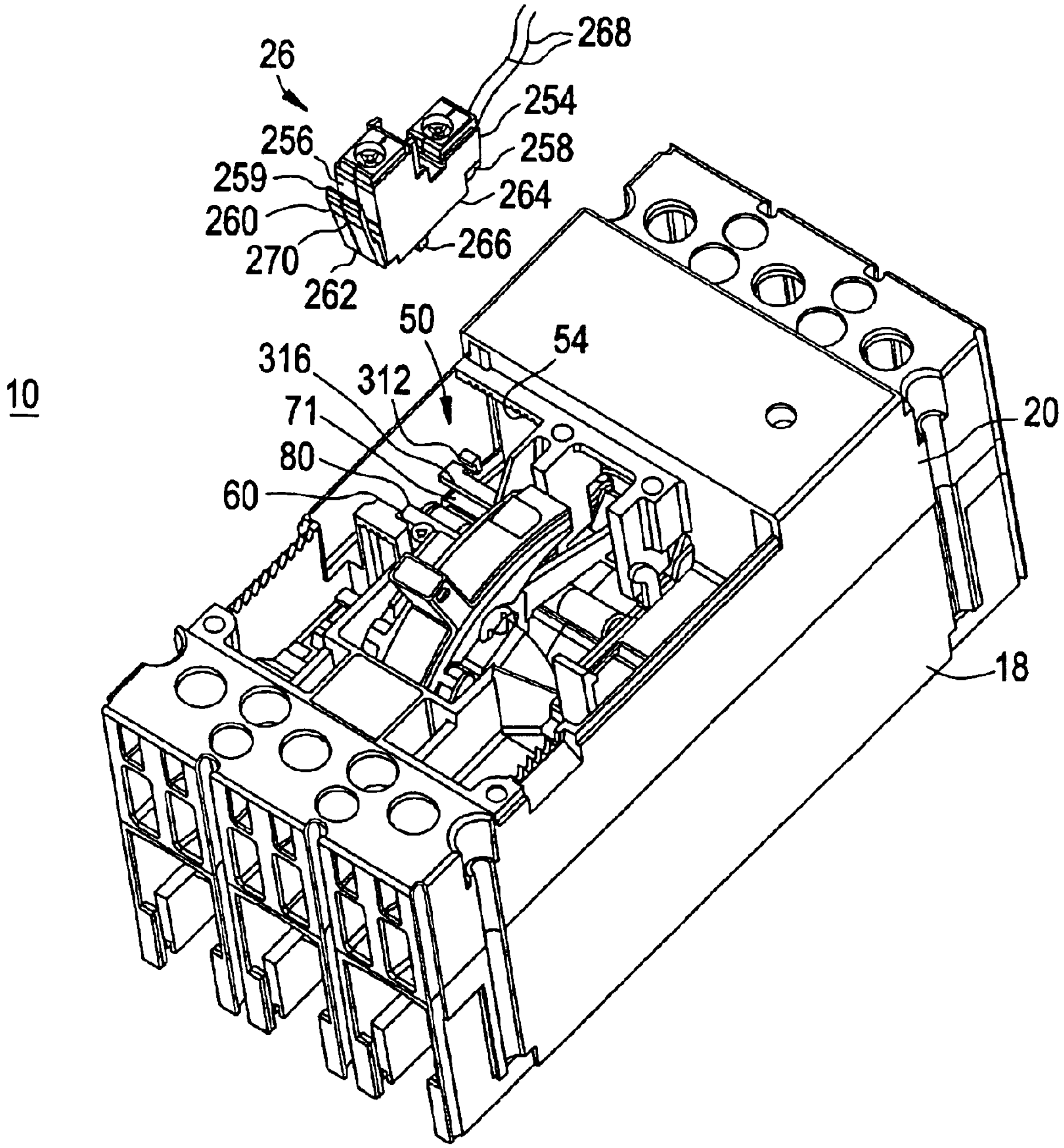
FIG. 3 is a side perspective view of the circuit breaker of FIG. 2 with the top cover removed and an actuator and an auxiliary switch in an assembly view.

Referring to FIG. 3, an isometric view of the circuit breaker 10 is shown, showing accessory 26 and a portion of an interface mechanism is shown generally in an exploded view with the top cover 22 (FIG. 1) removed. The accessory 26 is shown removed from a cavity 50 located within the mid cover 20 for clarity.

The cavity 50 is formed integral with the mid cover 20 and comprises a front mounting surface 54, a rear mounting surface 60 and a bottom surface connecting the rear and front mounting surfaces 60 and 54, respectively. The bottom surface of the cavity 50 is perpendicular to the front and rear mounting surfaces 54, 60. Located intermediate the rear mounting surface 60 and the front mounting surface 54 is a shelf 80. The shelf 71 and shelf 80 are integrally molded within the cavity 50.

The accessory 26 (e.g., an auxiliary switch accessory) is mounted within cavity 50 located within the mid cover 20. The switch 26 comprises a front surface 254 and a rear surface 256 and a connecting bottom surface 264. The front surface 254 having a tab 258 disposed thereon. Extending upward from the rear surface 256 is a mounting prong 260. A first end 262 of the mounting prong 260 is attached to the accessory 26 at a point just above the bottom surface 264. The mounting prong 260 is thin and flexible in comparison with the switch 26. The mounting prong 260 extends upward from the first end 262, it angles slightly away from the rear surface 256 of the switch 26. A second end 259 of the mounting prong 260 is separated a distance from the rear surface 256 of the accessory 26.

The accessory 26 also includes a push button plunger (plunger) 266 that is spring mounted from the bottom surface 264 of the accessory 26. The plunger 266 is spring loaded to permit the plunger 266 to be depressed closing contacts within the switch 26 and also to be released back outward opening the contacts within the switch 26. When the switch 26 is installed within the cavity 50 as described herein below, the plunger 266 extends downward and is positioned to align with an arm or compliant member shown generally at 316. The accessory 26 may then be connected with a remote bell alarm, for example, by means of a pair of wires 268 that extend from the accessory 26.

The accessory 26 is installed into the cavity 50 by the end user. When installing the accessory 26 into the cavity 50, the tab 258 of the accessory 26 is arranged so as to be inserted under the shelf 71. Then, the mounting prong 260 is flexed so that a tab 270 on the mounting prong 260 can snap into place under the shelf 80. Thus, the accessory 26 is held in position within the cavity 50 by the interaction of the tab 258 and the mounting prong 260 of the switch 26 with the shelf 71 and shelf 80, respectively. When the accessory 26 is installed in the mid cover 20 of the circuit breaker 10, the plunger 266 aligns with and is located proximate to the arm or compliant member 316.

Figure 4:
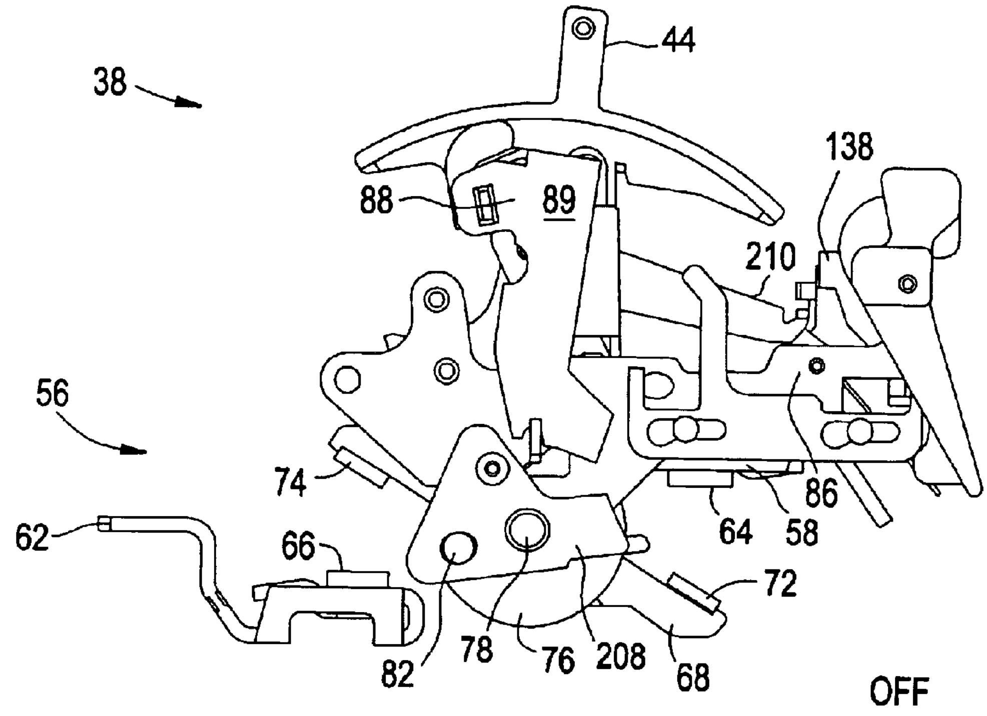
FIG. 4 is a partial sectional view of a rotary contact structure and operating mechanism embodied by the present invention in the "off" position.
Figure 5:
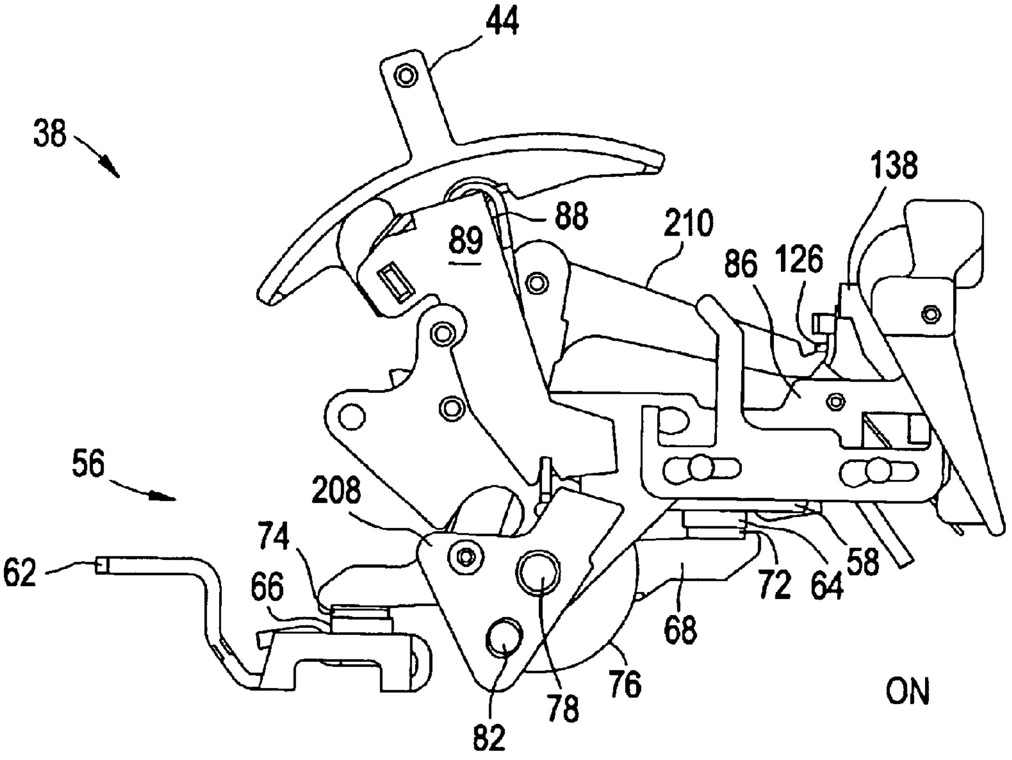
FIG. 5 is a partial sectional view of the rotary contact structure and operating mechanism of FIG. 3 in the "on" position.
Figure 6:
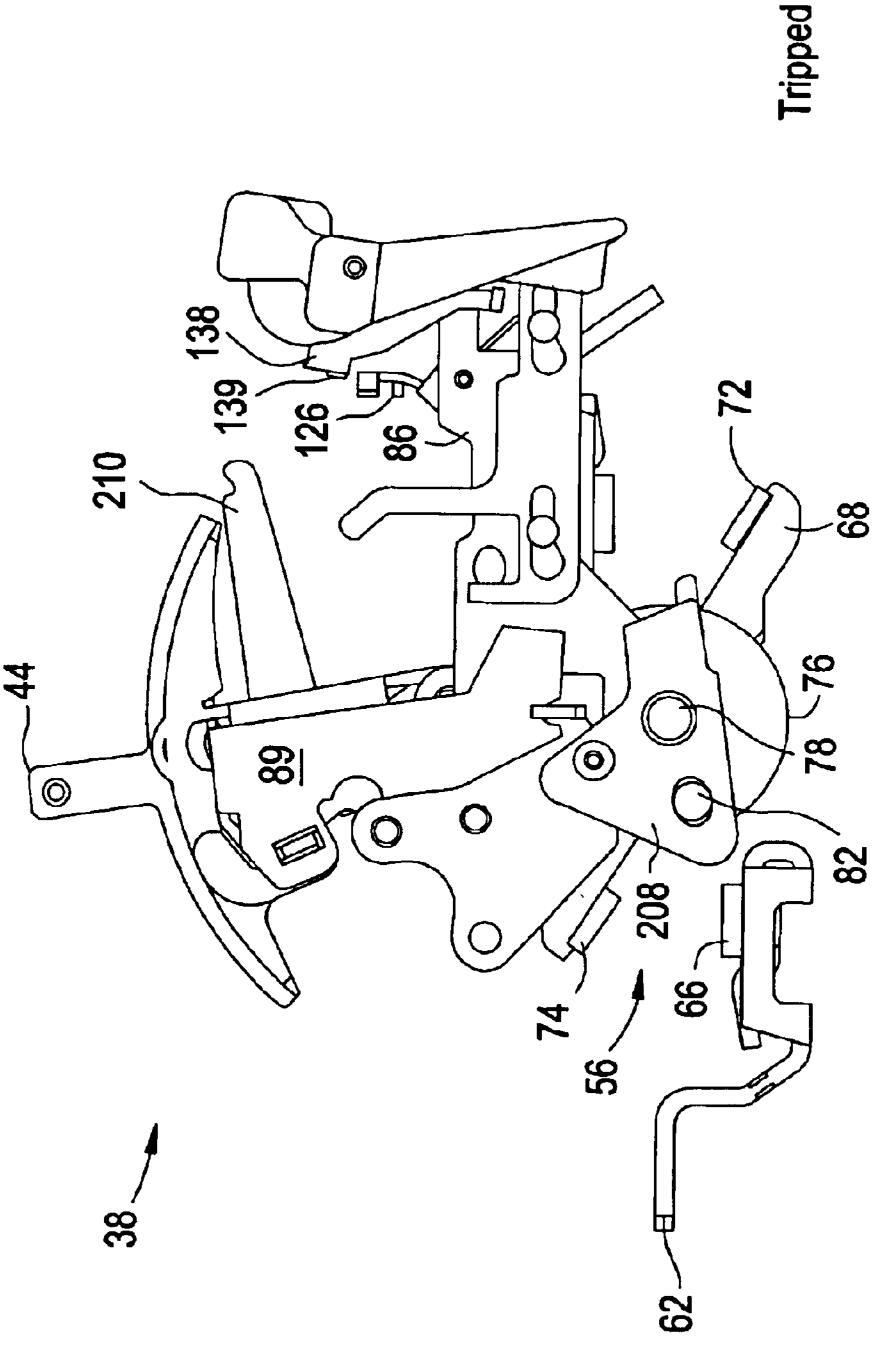
FIG. 6 is a partial sectional view of the rotary contact structure and operating mechanism of FIGS. 3 and 4 in the "tripped" position.

Referring now to FIGS. 4, 5, and 6, the operating mechanism 38 will now be detailed. An exemplary rotary contact assembly 56 is shown disposed within each cassette 32, 34, 36 and shown in the “off”, “on” and “tripped” conditions, respectively. Also depicted are partial side views of operating mechanism 38, the components of which are described in greater detail further herein. Rotary contact assembly 56 includes a load side contact strap 58 and line side contact strap 62 for connection with a power source and a protected circuit (not shown), respectively. Load side contact strap 58 includes a stationary contact 64 and line side contact strap 62 includes a stationary contact 66. Rotary contact assembly 56 further includes a movable contact arm 68 having a set of contacts 72 and 74 that mate with stationary contacts 64 and 66, respectively. In the “off” position (FIG. 4) of operating mechanism 38, wherein toggle handle 44 is oriented to the right (e.g., via a manual or mechanical force), contacts 72 and 74 are separated from stationary contacts 64 and 66, thereby preventing current from flowing through contact arm 68.

In the “on” position (FIG. 5) of operating mechanism 38, wherein toggle handle 44 is oriented to the left as depicted in FIG. 4 (e.g., via a manual or mechanical force), contacts 72 and 74 are mated with stationary contacts 64 and 66, thereby allowing current to flow through contact arm 68. In the “tripped” position (FIG. 6) of operating mechanism 38, toggle handle 44 is oriented between the “on” position and the “off” position (typically by the release of mechanism springs within operating mechanism 38, described in greater detail herein). In this “tripped” position, contacts 72 and 74 are separated from stationary contacts 64 and 66 by the action of operating mechanism 38, thereby preventing current from flowing through contact arm 68. When operating mechanism 38 is in the “tripped” position, it must ultimately be returned to the “on” position for operation. This is effectuated by applying a reset force to move toggle handle 44 to a “reset” condition, which is beyond the “off” position (i.e., further to the right of the “off” position in FIG. 4), and then back to the "on" position. This reset force must be high enough to overcome the mechanism springs, described herein.

Contact arm 68 is mounted on a rotor structure 76 that houses one or more sets of contact springs (not shown). Contact arm 68 and rotor structure 76 pivot about a common center 78. Cross pin 40 interfaces through an opening 82 within rotor structure 76 generally to cause contact arm 68 to be moved from the "on", "off" and "tripped" position.

Figure 7:
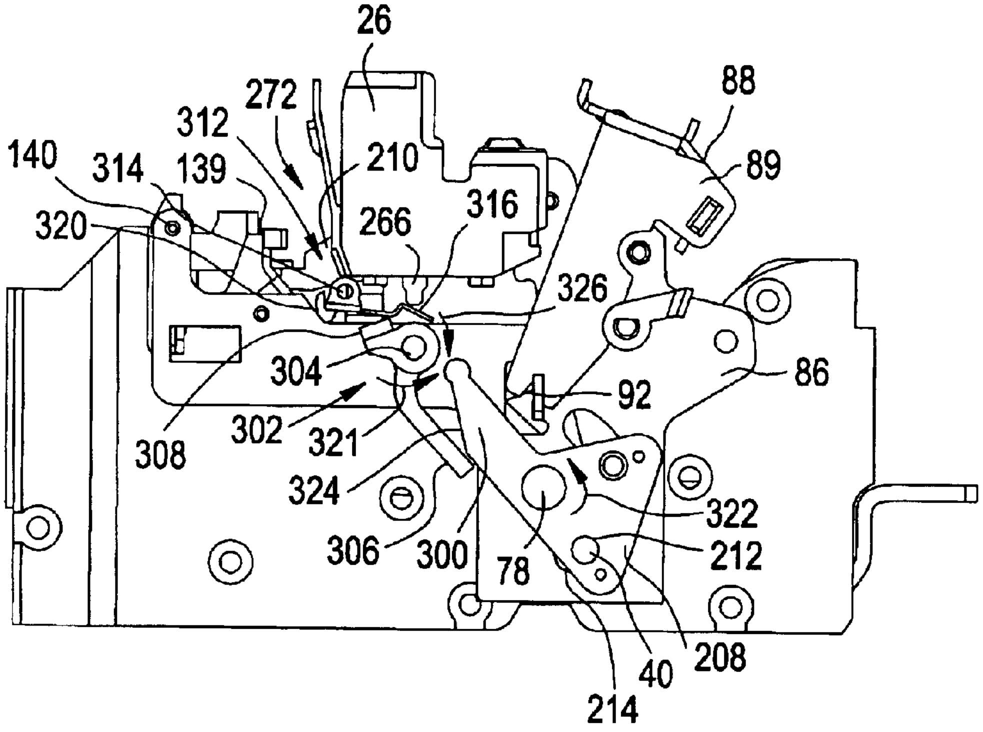
FIG. 7 is a side view of the operating mechanism in a closed/"on" position and the auxiliary switch in an inactivated position.
Figure 8:
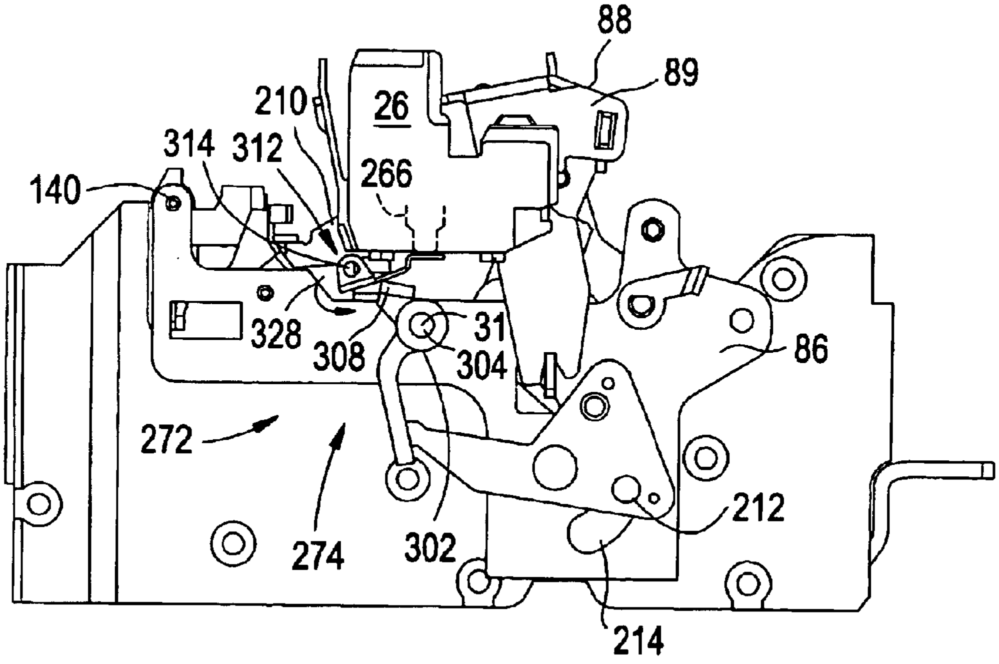
FIG. 8 is a side view of the operating mechanism in an open/"off" position and the auxiliary switch in an activated position.

Referring now to FIGS. 7 and 8, the components of operating mechanism 38 will now be detailed in relation to interfacing with accessory 26. As viewed in FIG. 7, operating mechanism 38 is in the closed or "on" position. Operating mechanism 38 has operating mechanism side frames 86 configured and positioned to straddle sidewalls 46, 48 of cassette 34 (FIG. 2).

Toggle handle 44 (FIG. 2) is rigidly interconnected with a drive member or handle yoke 88. Handle yoke 88 includes opposing side portions (only one shown) 89. Each side portion 89 includes a U-shaped portion 92 at the bottom portion of each side portion 89. U-shaped portions 92 are rotatably positioned on a pair of bearing portions (not shown) protruding outwardly from side frames 86.

Operating mechanism 38 has a pair of cranks 208 each operably connected to a corresponding cradle 210. Examples of rotary contact structures having such cradles that may be operated by operating mechanism 38 are described in more detail in U.S. patent application Ser. No. 09/795,017 Each crank 208 pivots about a center 78. Crank 208 has an opening 212 where cross pin 40 (FIG. 2) passes through into arcuate passage 52 of cassettes 32, 34 and 36 (FIG. 2) and a complementary set of arcuate passages 214 on each side frame 86.

Crank 208 includes a crank link 300 extending from crank 208. Crank link 300 is in operable communication with a first link shown generally at 302 that is pivotally mounted to the adjacent cassettes via a first pin 304. In an exemplary embodiment with reference to FIGS. 2 and 8, first pin 304 includes one of the two positioning rods 31, such that first link 302 pivots about positioning rod 31 disposed between each cassette 32, 34, 36. First link 302 includes a first arm 306 disposed at one end of link 302 and a contact member 308 disposed at an opposite end thereof. One end of first arm 306 extends from first pin 304 while an opposite end is in operable communication with crank link 300 discussed more fully below.

Contact member 308 pivots about pin 304 in tandem with first arm 306 at an opposite end thereto. Contact member 308 in turn is in operable communication with a second link shown generally at 312 that is pivotally mounted in a pocket of mid cover 20 via a second pin 314. Second link 312 includes a second arm 316 depending at one end from link 312 and is in operable communication with an end surface of plunger 266 defining plunger 266. Plunger 266 is preferably biased toward first link 302 providing a bias on second arm 316 to bias second link 312 to pivot in a clockwise direction indicated by arrow 320 around pin 314. The bias of second link 312 in the direction indicated by arrow 320 causes first link 302 to be biased in a counter clockwise direction indicated by arrow 321, which causes crank link 300 to rotate clockwise. In this manner, the bias on crank link 300 is in the same clockwise direction that a bias on crank 208 is urging the pair of contacts in the "on" position.

Referring now to FIGS. 7 and 8, operation of an exemplary embodiment of an auxiliary switch accessory interface mechanism will be described shown generally at 272. FIG. 8 depicts the breaker contacts in the open or "off" position. FIGS. 7 and 8 also illustrate accessory 26 shown in the inactivated position and the activated position, respectively, via translation of plunger 266. The interface mechanism 272 includes a set of linkages comprising crank link 300, first link 302, and second link 312 in mechanical cooperation with each other and with crank 208 and plunger 266 of accessory 26 to change the state of accessory 26.

FIG. 7 depicts the closed or "on" position when the contacts are closed and the accessory 26 biases plunger 266 away therefrom to indicate a first state. The first state in this embodiment is indicative of the "on" position and accessory 26 is considered inactivated. When accessory 26 and interface mechanism are employed together a mechanical auxiliary switch assembly (assembly) 274, for example, assembly 274 is employed to provide indication when the operating mechanism 38 is discharged as is the case when the circuit breaker 10 (FIG. 1) is in the tripped condition or manually placed in the "off" condition and accessory 26 is considered activated.

In operation, as the breaker contacts begin to open from the closed position depicted in FIG. 7, crank 208 and crank link 300 rotate counter clockwise indicated by direction arrow 322 which causes a tapered portion 324 of link 300 to first engage and rotate first link 302 in a clockwise direction indicated by arrow 326. Tapered portion 324 engages first arm 306 of first link 302 causing clockwise rotation thereof (arrow 326 in FIG. 7) which causes contact member 308 to also engage and rotate second link 312 in a counter clockwise direction indicated by arrow 328 in FIG. 8. When second link 312 turns counter clockwise shown by arrow 328, second arm 316 extending from second link 312 also turns counter clockwise and urges plunger 266 into accessory 26 to a retracted position. When plunger 266 illustrated in phantom in FIG. 8 is in the retracted position, accessory 26 changes state, such that the first state is changed to a second state indicative that the circuit breaker contacts are no longer closed.

Second arm 316 as shown in FIGS. 7 and 8 is configured as a stepped or offset compliant member, such that one side of the offset is in mechanical cooperation with contact member 308 of first link 302 while an opposite side of the offset is in mechanical cooperation with the end of the plunger 266. The size of the offset in second arm 316 is configured based on the distances between plunger 266, second link 312, and pivot pin 314, as well as the angle created therebetween.

Second arm 316 is preferably configured as a compliant member such that it allows flexible motion to "take up" variable gaps to compensate for any over travel resulting from possible tolerance variations of the interface mechanism or variations in actuation stroke of the plunger 266. More specifically, the compliant member is configured to flex providing "take up" for any over-travel as a result of positional variations at an interface of the accessory device and the circuit breaker operating mechanism due to manufacturing tolerances, assembly tolerances, accessory device installation, or extreme variations in actuation stroke of the plunger. The second link 312, and in particular the second arm 316, is employed to provide mechanical cooperation between the interfaced members, (the crank 208 and accessory 26), While adding compliancy to absorb forces in excess of those required to change the state of the accessory 26.

In an exemplary embodiment, second arm 316 is preferably fabricated as a thin strip of stainless steel that is designed to flex when the force to operate the switch or accessory is exceeded, providing the "take-up" for any remaining over-travel as a result of variations due to part and assembly tolerances and accessory installation. However, other suitable materials are contemplated that provide the required "take up" and is not limited to stainless steel.

When the circuit breaker 10 is tripped, for example due to an overcurrent condition or a mechanical trip, toggle handle 44 is between the "ON" position (FIG. 7) and the "OFF" position (FIG. 8). Upon the occurrence of such an overcurrent condition and simultaneous articulation of the operating mechanism 38 to separate the contacts, the assembly 274 is activated consistent with the circuit breaker 10 being in the uncharged state. The activation of the accessory 26 whereby the plunger 266 is urged to a retracted position, as shown in FIG. 8, provides an indication to a remote operator, for example, that such a tripped condition has occurred and that the operating mechanism 38 has responded to interrupt the circuit current.

In order to reengage the operating mechanism 38 to the "ON" position, so as to return to quiescent condition, both operating mechanism 38 and assembly 274, or more particularly, the switch 26 must be reset.

Before toggle handle 44 may be returned to the quiescent operation position, i.e., "ON", circuit breaker operating mechanism 38 must be reset. This is accomplished by manually rotating toggle handle 44 in the counter-clockwise direction against the forces of one or more springs (not shown), thereby resetting latch 138 of operating mechanism 38 from the "Tripped" position to the "Latched" position.

A compliant member, and in particular the second arm 316, is employed to provide mechanical cooperation between the interfaced members, (the crank 208 and the accessory 26), while adding compliancy to absorb forces in excess of those required to reset the accessory 26.

It will also be recognized by one skilled in the pertinent art that the first link 302 and the second link 312 are pivotally disposed such that the accessory device 26 uses energy from the operating mechanism in moving the pair of contacts from the "on" to "off" position. In this manner, robbing energy from the operating mechanism during the critical "off" to "on" operation that is typical in conventional systems is avoided.

Thus, interface mechanism 272 disposable between the circuit breaker and internal accessories is provided which easily provides actuation of variably configured auxiliary switches or accessories when the circuit breaker changes state in either an overload "trip" condition or an "on" to "off" manual operation. The interface mechanism stores energy from the operating mechanism when going from the "on" to "off" operation of the circuit breaker, thereby using only the stored energy during the more critical "off" to "on" operation, without robbing the operating mechanism of any energy during this critical "off" to "on" operation. Accessory 26 is easily installed and is contained within the space available within the mid cover 20. The relevant UL requirement allows the customer to remove the top cover 14 (FIG. 2) and install the accessories since the operating mechanism and all other exposed metal parts are electrically isolated from the live parts within the cassettes. Also, the end user can easily utilize the interface mechanism 272 with the accessory 26 that is easily engaged within the mid cover 20. Additionally, any manufacturing variances as to the precise location of the accessory 26 or variably dimensioned accessories 26 within mid cover 20, and relative to the cradle 106 of the operating mechanism 38 are tolerated, as are field or installation imperfections that may jolt or otherwise shift the locations of the accessory 26 relative to the cradle 106. The interface mechanism 272 has the ability to compensate for manufacturing tolerances to ensure that the accessory 26 provides accurate status indications of the operating mechanism 38 through the set of linkages employed in the interface mechanism 272.

While the invention has been described with reference to a preferred embodiment, it will be understood by those skilled in the art that various changes may be made and equivalents may be substituted for elements thereof without departing from the scope of invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An assembly for interacting with an operating mechanism of a circuit breaker, the circuit breaker including a housing and a pair of contacts within the housing, the operating mechanism arranged to separate the pair of contacts upon actuation thereof, the assembly comprising:

an accessory device disposed in the housing including a plunger configured for movement between a retracted position and a protruded position;

a crank link having operable communication with the operating mechanism;

a first link in mechanical cooperation with said crank link; and a second link in mechanical cooperation with said first link and said plunger, wherein the operating mechanism applies a force to said crank link, the force changing a state of said accessory device by being transmitted from the operating mechanism to said crank link, from said crank link to said first link, from said first link to said second link, from said second link to said plunger for changing a position of said plunger from one of said protruded position and said retracted position.

2. The assembly of claim 1, wherein said first link includes a first lever rotatable about a first pivot, said lever having a first free end and a second free end, said first free end configured for mechanical cooperation with said crank link, said second free end configured for mechanical cooperation with said second link.

3. The assembly of claim 1, wherein said accessory device is an auxiliary switch.

4. The assembly of claim 1 wherein said second link includes a second lever rotatable about a pivot, said second lever being a compliant member configured for interacting with said first link and said plunger.

5. The assembly of claim 4 wherein said compliant member is configured to flex providing "take up" for any over-travel as a result of positional variations at an interface of the accessory device and the circuit breaker operating mechanism due to one of manufacturing tolerances, assembly tolerances, accessory device installation, and extreme variations in actuation stroke of said plunger.

6. The assembly of claim 4 wherein said compliant member is a thin strip of stainless steel.

7. The assembly of claim 4 wherein said compliant member is configured having an offset intermediate therein, one side of said offset in mechanical cooperation with said first link while another side of said offset opposite said one side is in mechanical cooperation with said plunger.

8. The assembly of claim 1 wherein said first link and said second link are pivotally disposed such that the accessory device uses energy from the operating mechanism in moving the pair of contacts from the "on" to "off" position.

9. The assembly of claim 1 wherein said crank link is operably connected to a contact rotary arm connected to the pair of contacts.

10. A circuit breaker comprising:

a housing;

a pair of electrical contacts within said housing;

an operating mechanism arranged to separate said pair of electrical contacts;

an accessory device disposed in the housing including a plunger configured for movement between a retracted position and a protruded position;

a crank link having operable communication with the operating mechanism;

a first link in mechanical cooperation with said crank link; and a second link in mechanical cooperation with said first link and said plunger, wherein the operating mechanism applies a force to said crank link, the force changing a state of said accessory device by being transmitted from the operating mechanism to said crank link, from said crank link to said first link, from said first link to said second link, from said second link to said plunger for changing a position of said plunger from one of said protruded position and said retracted position.

11. The circuit breaker of claim 10, wherein said first link includes a first lever rotatable about a first pivot, said lever having a first free end and a second free end, said first free end configured for mechanical cooperation with said crank link, said second free end configured for mechanical cooperation with said second link.

12. The circuit breaker of claim 10, wherein said accessory device is an auxiliary switch.

13. The circuit breaker of claim 10 wherein said second link includes a second lever rotatable about a pivot, said second lever being a compliant member configured for interacting with said first link and said plunger.

14. The circuit breaker of claim 13 wherein said compliant member is configured to flex providing "take up" for any over-travel as a result of positional variations at an interface of the accessory device and the circuit breaker operating mechanism due to one of manufacturing tolerances, assembly tolerances, accessory device installation, and extreme variations in actuation stroke of said plunger.

15. The circuit breaker of claim 13 wherein said compliant member is a thin strip of stainless steel.

16. The circuit breaker of claim 13 wherein said compliant member is configured having an offset intermediate therein, one side of said offset in mechanical cooperation with said first link while another side of said offset opposite said one side is in mechanical cooperation with said plunger.

17. The circuit breaker of claim 10 wherein said first link and said second link are pivotally disposed such that the accessory device uses energy from the operating mechanism in moving the pair of contacts from the "on" to "off" position.

18. The circuit breaker of claim 10 wherein said crank link is operably connected to a contact rotary arm connected to the pair of contacts.

19. An assembly for interacting with an operating mechanism of a circuit breaker, the circuit breaker including a housing and a pair of contacts within the housing, the operating mechanism arranged to separate the pair of contacts upon actuation thereof, the assembly comprising:

an accessory device disposed in the housing including a plunger configured for movement between a retracted position and a protruded position;

a means for receiving mechanical energy from the operating mechanism upon movement of the pair of contacts;

a first link in mechanical cooperation with said means for receiving mechanical energy; and a second link in mechanical cooperation with said first link, said second link having a compliant means disposed for actuation of said plunger, wherein the operating mechanism applies a force to said means for receiving mechanical energy, the force changing a state of said accessory device by being transmitted from the operating mechanism to said means for receiving the force, from means for receiving the force to said first link, from said first link to said second link, from said second link having said compliant means to said plunger for changing a position of said plunger from one of said protruded position and said retracted position.

* * * * *